United States Patent [19]

Leclercq et al.

[11] Patent Number: 4,762,661
[45] Date of Patent: Aug. 9, 1988

[54] UPPER END PIECE FOR NUCLEAR FUEL ASSEMBLIES

[75] Inventors: Joseph Leclercq, Saint Didier au Mont d'Or; Jean N. Canat, Lyon, both of France

[73] Assignee: FRAGEMA, Courbevoie, France

[21] Appl. No.: 721,350

[22] Filed: Apr. 9, 1985

[30] Foreign Application Priority Data

Apr. 10, 1984 [FR] France .................. 84 05652

[51] Int. Cl.⁴ .................. G21C 7/02; G21C 7/20; G21C 3/32
[52] U.S. Cl. .................. 376/209; 376/234; 376/285; 376/364; 376/446
[58] Field of Search .............. 376/449, 234, 353, 225, 376/209, 327, 333, 364, 285, 446

[56] References Cited

U.S. PATENT DOCUMENTS

| | | | |
|---|---|---|---|
| 3,853,703 | 12/1974 | Anthony et al. | 376/364 |
| 4,035,230 | 7/1977 | Bevilacqua | 376/225 |
| 4,155,808 | 5/1979 | Jabsen | 376/449 |
| 4,269,661 | 5/1981 | Kmonk et al. | 376/353 |
| 4,304,631 | 12/1981 | Walton et al. | 376/364 |
| 4,544,521 | 10/1985 | Millot et al. | 376/209 |

FOREIGN PATENT DOCUMENTS

| | | | |
|---|---|---|---|
| 0064430 | 11/1982 | European Pat. Off. | 376/234 |
| 0151082 | 8/1985 | European Pat. Off. | 376/209 |
| 1194074 | 6/1965 | Fed. Rep. of Germany | 376/234 |
| 1325396 | 3/1963 | France | 376/234 |
| 2070028 | 9/1971 | France . | |

OTHER PUBLICATIONS

Nuclear Technology, vol. 59, No. 3, 12/82, pp. 476–482.

Primary Examiner—Deborah L. Kyle
Assistant Examiner—Daniel Wasil
Attorney, Agent, or Firm—Pollock, Vande Sande & Priddy

[57] ABSTRACT

A nuclear fuel assembly for a spectral shift reactor has an upper end piece and a lower end piece secured to a structural element belonging to the upper end piece by guide tubes arranged for receiving a cluster of control elements. The upper end piece further comprises a support member arranged for receiving said cluster at the end of the fall thereof, means for guiding said support member. The support member is guided for movement parallel to the axis of the guide tubes. Springs are contained within the end piece and disposed between the structural member and the plate for braking the cluster at the end of the fall thereof.

8 Claims, 2 Drawing Sheets

UPPER END PIECE FOR NUCLEAR FUEL ASSEMBLIES

BACKGROUND AND SUMMARY OF THE INVENTION

The invention relates to an upper end piece of a nuclear fuel assembly for a pressurized water reactor, which assembly comprises a lower end piece secured to a structural element belonging to the upper end piece by guide tubes for receiving a cluster of control elements.

The invention is particularly suitable for use in spectral shift reactors in which the energy spectrum of the neutrons in the core is modified as the fuel burns up. This modification is obtained by changing the proportion of moderator in the core, by means of clusters of elements whose role is to replace moderating water in some at least of the guide tubes of an assembly (French No. 82 18011).

The fuel assemblies of the above-defined type generally comprise means for damping the fall of the control element clusters upon shut down of the reactor. These means often operate by throttling outflow of water contained in the guide tubes when the control elements approach their lower position. The throttling action may be obtained by a restriction in the lower part of the guide tubes.

The damping means have the disadvantage of considerably complicating the manufacture of the guide tubes because of the accuracy required in adjusting the damping effect. To complete the damping effect of the head loss impressed to the outflow, it has been proposed to add resilient means which are compressed by the cluster at the end of movement (French Nos. 2 106 373 and 2 070 373). The resilient means are integrated in the device controlling the cluster and consequently must have a small volume and a correspondingly low damping effect. Consequently, they only have a truly significant effect when the cluster is of moderate weight and so comprises a small number of control elements.

The nuclear fuel assemblies for use in spectral shift reactors raise an additional problem, because each assembly must be adaptated for receiving a cluster of control elements controlling the reactor moderation rate in addition to the usual cluster of absorbing control elements or in place thereof.

It is an object of the invention to provide an improved upper end piece; it is a more specific object to provide an end piece for satisfactory damping during fall of the control sclusters or "scram", using resilient means whose design does not contradict space considerations.

To this end, there is provided an upper end piece for a nuclear fuel assembly which comprises an abutting member for receiving the cluster at the end of its fall, means for guiding said abutting member parallel to the axis of the guide tubes and resilient means within the end piece and disposed between the structural member and the abutting member for absorbing the energy of the cluster at the end of the fall thereof.

In the case of an end piece for a spectral shift reactor assembly, adapted for receiving a cluster of absorbent elements and/or a cluster of elements for modifying the moderation rate by driving out the water contained in guide tubes, the resilient means of the end piece may comprise two springs and two abutment elements each cooperating with one of the clusters, one of which is formed by a plate constituting said abutting member. The springs may be disposed so that only one of the two is compressed by the fall of a particular one of the clusters, whereas the two springs are compressed and provide a damping function upon fall of the other cluster. The two springs may be disposed coaxially to each other.

The end piece may be completed by additional resilient means located to receive an upper core plate and thus to complete the hold-down function of the coaxial springs, i.e. to oppose raising of the assembly by the upward flow of the water serving as moderator and coolant, during operation of the reactor.

In an advantageous embodiment of the invention, the end piece forms a block independent of the rest of the assembly which comprises, in addition to the lower end piece and guide tubes, a simple upper perforated table fixed permanently to the guide tubes. Thus it is possible to replace the end piece should it be damaged or, on the contrary, to use the end piece successively on several assemblies, the end piece being easily removed from a completely exhausted assembly or a defective assembly.

The invention will be better understood from reading the following description of particular embodiments given by way of non limitative examples.

SHORT DESCRIPTION OF THE DRAWINGS

FIG. 1 shows an upper end piece according to a first embodiment, in elevation and in section through the plane I—I of FIG. 2, FIG. 2 shows a fraction of the end piece of FIG. 1, seen from above, FIG. 3, similar to FIG. 1, shows a modified end piece.

DETAILED DESCRIPTION OF PREFERRED EMBODIMENTS

Figure 1:
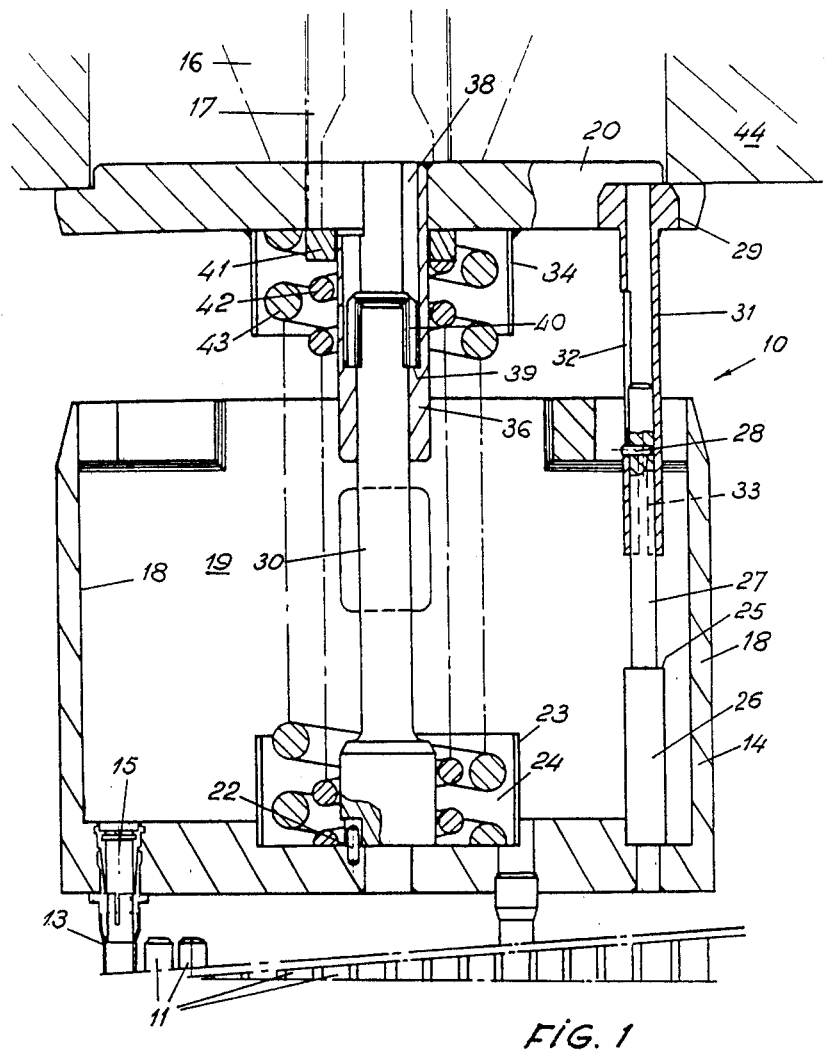
Figure 2:
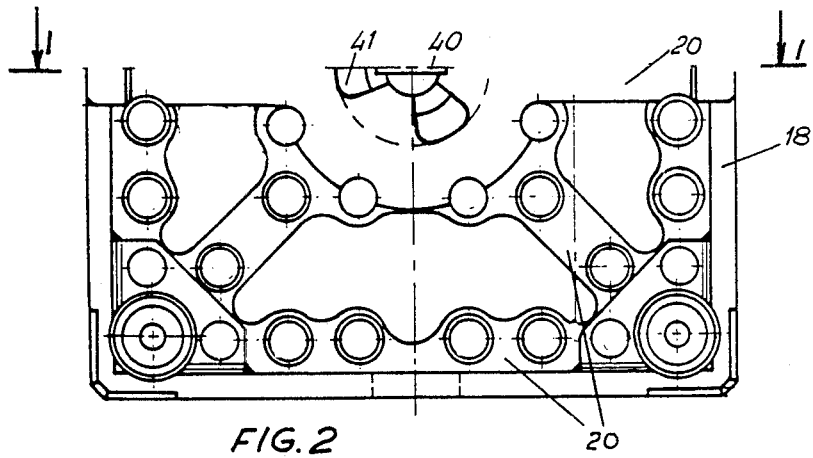

The upper end piece 10 shown in FIGS. 1 and 2 is intended for a fuel assembly for a light water reactor. This assembly may have a general known construction and thus will not be described in detail. In FIG. 1, in addition to end piece 10, only a few fuel elements 11 and guide tubes 13 have been shown some at least of which provide the mechanical integrity of the fuel assembly by connecting together the upper end piece 10 and a lower end piece similar to the lower end piece 10a of FIG. 3. Grids (not shown), spaced apart longitudinally along the guide tubes, hold the elements in place.

In the embodiment shown in FIG. 1, guide tubes 13 are fixed to a structural member 14 forming the framework of the end piece 10. the structural member 14 comprises a base plate to which the guide tubes 13 are fixed. In the case illustrated in FIG. 1, guide tubes 13 are fixed by a sleeve and a threaded socket 15. They could be fixed by other methods, for example by welding. The structural member 14 also comprises vertical plates 18 which, with the base plate, define an inner space forming a caisson 19. The base plate is formed with openings (not shown) for the free circulation of water.

Guide tubes 13 are provided for receiving control elements (not shown). The end piece shown in FIG. 1 is intended for an assembly whose guide tubes are adapted for allowing the passage of control elements which are either elements containing a neutron absorbing material, or elements modifying the moderation rate, by modifying the volume of moderator in the fuel assembly, so as to provide so called "spectral shift" mode operation. The control elements of each group are combined in a cluster by a mobile mount, which is generally called "spider". The two spiders 16 and 17 are disposed coaxially. Their lower parts are shown, in the position where they rest on the end piece, with a dash dot line.

Spider 16 will generally support the absorbent element cluster and will be suspended from a handling tube surrounding a rod for handling the spider 17 which supports the elements controlling the moderation rate (elements containing fertile material). The absorbent cluster thus caps the fertile cluster. It may be moved by means of an uncouplable ratchet mechanism for releasing it in the core.

The structural member 14, which may be manufactured by molding, contains all damping and hold-down means with which end piece 10 is equipped.

The damping means comprise a bearing member 20, which may slide with respect to the structural member 14 in the direction of the axis of the guide tubes 13, which comprises means for guiding with respect to the structural member and which is urged by the resilient damping means integrated in the end piece towards the position shown in FIG. 1. This support member 20 is adapted for receiving the shock of the spider, or of one of the spiders (spider 16 in the case of FIG. 1) should the corresponding element cluster fall for example for stopping the reactor.

The guide means comprise a hub 30 fixed in the center of the base plate and projecting upwardly. Orientation of hub 30 is fixed by the engagement of key 22, secured to the base plate, in a notch of the hub. The base plate also comprises a circular collar 23, coaxial with hub 30. The hub and the collar may be fixed by welding. The collar 23 defines a zone 24 for receiving the support zone of the resilient means.

The guide means also comprise studs 26, four in number for example, each fixed close to a corner of the base plate, projecting upwardly. A single one of these studs 26 is shown. It comprises a top part of reduced diameter 27, separated from the low part by a shoulder 25.

With the guide means which have just been described and which are carried by the structural member 14 are associated complementary means fixed to the support member 20. This latter is in the form of a plate in which are formed wide water flow apertures or of an annular piece comprising radial fins in number equal to that of studs 26. In member 20 are formed holes 29 for receiving sleeve 31 aligned with the studs 26. The bore of each sleeve 31 has a diameter corresponding to that of the reduced diameter portion 27 of the corresponding stud. The external diameter of the sleeve corresponds to that of the lower part of stud 26. Each sleeve 31 is retained on the corresponding stud 26. For that, the sleeve has a groove 32 parallel to the axis in which is engaged a key 28 set in stud 27. For it to be possible to engage sleeve 31 while key is in position, groove 32 opens into a bayoned shaped groove 33 having an axial portion and a circumferential portion, emerging at the base of groove 32. To position sleeve 31, it is therefore sufficient to present groove 33 opposite key 28, to push it in then to rotate sleeve 31, by 90° for example, so that the key is situated at the bottom of groove 32. Then the sleeve 21 may be fixed to the support member 20 for example by welding.

To the support member 20 are fixed, for example by welding, a collar 34 identical to collar 23 and a hollow hub 36 cooperating with hub 30. The bore of hub 36 has a diameter such that hubs 36 and 30 have a sliding fit one on the other. In the top part of the bore grooves 38 are formed, two in number for example, extending substantially over two thirds of the height of the hub, defining shoulders 39. These shoulders form stops for a U shaped key 40 defining the rest position of the support member 20. Key 40 may be secured by welding when the support member 20 is forced into its lower most position, defined by the abutment of sleeves 31 on shoulders 25.

The resilient damping means comprise a first spring 43 retained between the support member 20 and the structural member 14, whose endmost parts are surrounded by collars 23 and 34. Since the end piece shown in FIG. 1 is intended for an assembly which may receive, on the one hand, a cluster of absorbent elements and, on the other, a cluster of spectrum modification elements, the end piece also comprises a ring 41 mounted for sliding on hub 36 and a spring 42 coaxial with spring 43, but bearing on the structural member 14 and on ring 41. Spring 42 ends to hold ring 41 in abutment against member 20. In this latter are formed indentations for the passage of the lower part of spider 17, allowing this latter to come into abutment against ring 41 (as shown with a dash dot line) and to urge it downwardly.

When the assembly is in position in a reactor and when the upper core plate 44 is in position, the thrust exerted by the upwardly flowing coolant is transmitted by the structural member 14 to springs 42 and 43 which in their turn bear on member 20. Should the cluster carried by spider 17 fall (cluster of elements for modifying the moderation rate in general), spider 17 comes into abutment against ring 41 and forces it down by overcoming the resilient force exerted by spring 42. This latter damps the shock by forming a resilient stop.

Should the cluster carried by spider 16 fall, this latter strikes the support member 20 which is driven in while compressing springs 42, through ring 41 and 43. The springs act jointly as resilient end-of-travel stops.

Similarly, the two springs come into play should there be a simultaneous fall of the two clusters, for example for shutting down the reactor.

Figure 3:
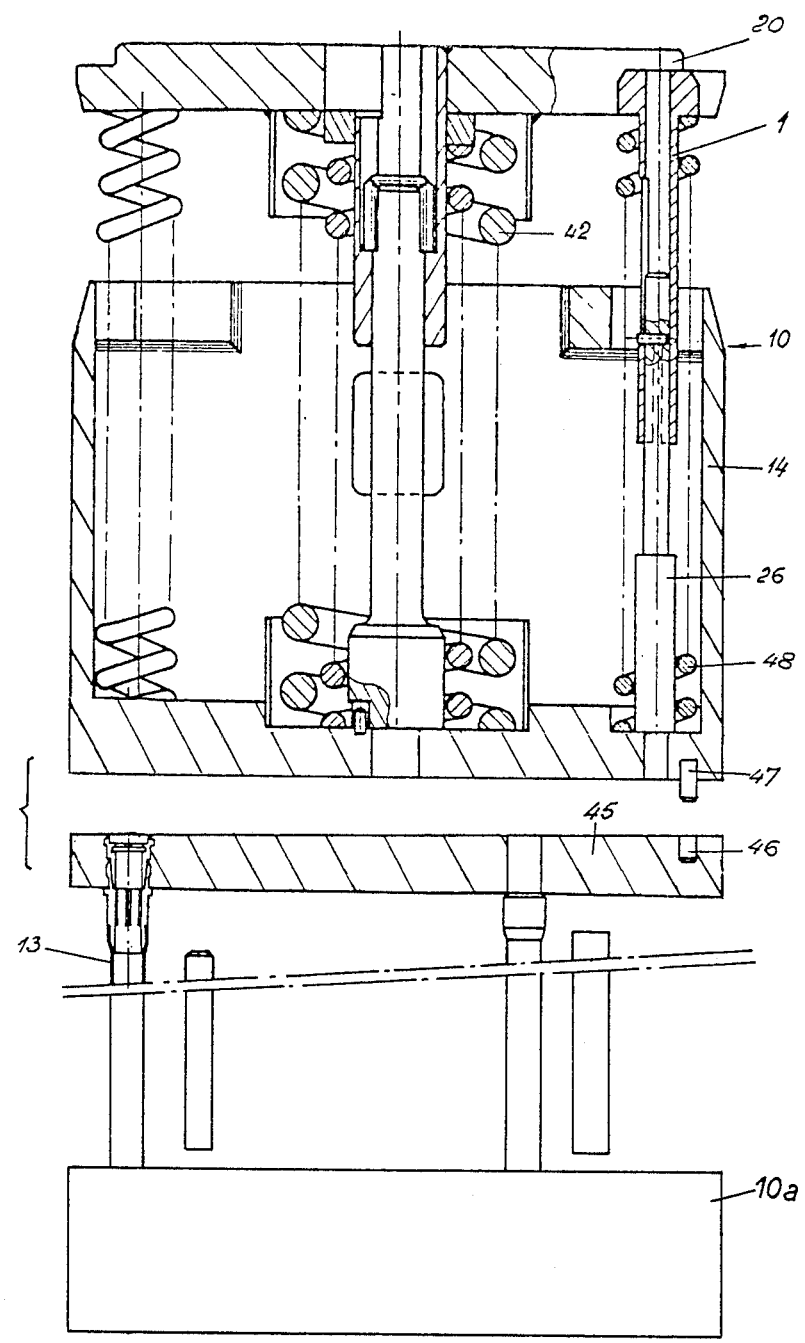

In the variant of the invention shown in FIG. 3 (where the parts corresponding to those of FIG. 1 are designated by the same reference number), end piece 10 forms a block which may be handled independently of the skeleton of the assembly.

In the assembly properly speaking, the upper end of guide tubes 13 is fixed, by removable members such as sleeves or by welding, to a simple upper table 45 having large water passage openings (not shown). These openings correspond to those which are formed in the base plate of the structural member 14. Table 45 also has an external shape corresponding to that of the structural member 14. It is secured thereto by removable means (not shown) which may be formed by screws passing through the base plate of the structural member 14 and engaged in tapped holes in the table. The screws may be locked against rotation after mounting, for example by deformation of a thin cap which they comprise in a recess of corresponding shape in the base plate.

So as to avoid any error of orientation during mounting, fool-proof means are provided on the structural member 14 and table 45. In the embodiment illustrated in FIG. 3, they comprise at least one stud 47 (key or split sleeve) intended to be engaged in a hole 46 of corresponding shape in table 45.

In another embodiment, table 45 is secured to the structural member 14 only by studs 27 engaging in holes 46, judiciously spaced apart around the periphery of member 14 and table 45.

With this arrangement, should there be a defect or failure of an element of end piece 10, only this latter need be replaced which only involves simple operations.

Between the structural member 14 and the support member 20 of the end piece of FIG. 3 are compressed, in addition to springs 42 and 43, springs 48 each disposed about one of the studs 26. The action of springs 48 is added to that of springs 42 and 43 and increases the force exerted on the assembly by the upper core plate 44, which force opposes raising of the assembly through the action of the water which flows in the core.

The end piece which has just been described will be adapted so as to be able to be gripped by handling grippers which will often lead to completing it with a peripheral groove or other means facilitating gripping thereof.

We claim:

1. In a pressurized water reactor having a core consisting of upstanding fuel assemblies, an upper core plate above said core and clusters of control elements vertically movable into and out some at least of said fuel assemblies, nuclear fuel assembly comprising:
   an upper end piece comprising a structural element,
   a lower end piece, and
   a plurality of guide tubes arranged for receiving at least one cluster of control elements and mechanically connecting said structural element and lower end piece,
   wherein said upper end piece further comprises:
   a support member vertically movable with respect to said structural element, arranged for abutting connection with said cluster upon fall of the latter,
   means for slidably guiding said support member parallel to the axis of the guide tubes, and
   resilient means contained within said upper end piece, located between said structural element and said support member and exerting on said support member an upwardly directed force biasing said support member away from said structural element into abutment with said upper core plate and exerting a fall damping force on said cluster at the end of the fall thereof, and
   wherein said resilient means comprises at least one spring located about mutually slidable guide means located along a longitudinal axis of the fuel assembly.

2. A nuclear fuel assembly according to claim 1, wherein said guiding means further comprise mutually slidable elements located in close proximity to some at least of corners of said fuel assembly.

3. A nuclear fuel assembly according to claim 2, wherein some at least of said sliding means are each surrounded by a spring which is compressed between the structural element and the support member.

4. A nuclear fuel assembly according to claim 2, wherein the guiding means comprise abutting elements mutually cooperating for limiting the spacing apart of the structural element and support member under the action of the resilient means to a predetermined distance.

5. A nuclear fuel assembly according to claim 1, wherein the structural element comprises a base plate arranged for connection to the guide tubes and vertical plates for defining with said base plate an internal space for protection of the guiding means and resilient means.

6. In a pressurized water nuclear reactor having a core consisting of upstanding fuel assemblies, an upper core plate above said core and clusters of control elements vertically movable into and out some at least of said fuel assemblies, a nuclear fuel assembly comprising:
   an upper end piece comprising a structural element,
   a lower end piece, said upper end piece forming a block independent of the rest of the fuel assembly and being provided for connection to an upper perforated table permanently fixed to the guide tubes and removably connected to said structural element of the upper end piece, and
   a plurality of guide tubes arranged for receiving at least one cluster of control elements and mechanically connecting said structural element and lower end piece,
   wherein said upper end piece further comprises:
   a support member vertically movable with respect to said structural element, arranged for abutting connection with said cluster upon fall of the latter,
   means for slidably guiding said support member parallel to the axis of the guide tubes, and
   resilient means contained within said upper end piece, located between said structural element and said support member and exerting on said support member an upwardly directed force biasing said support member into abutment with said upper core plate and exerting a fall damping force on said cluster at the end of the fall thereof.

7. In a spectral shift pressurized water nuclear reactor having a core consisting of upstanding fuel assemblies, an upper core plate above said core, first clusters of neutron absorbing control rods vertically movable into and out of some at least of said fuel assemblies, second clusters of rods vertically movable into and out of some at least of said fuel assemblies for modifying the moderation rate by forcing out water contained in said fuel assemblies when inserted in said fuel assemblies, a nuclear fuel assembly comprising:
   an upper end piece comprising a structural element,
   a lower end piece, and
   a plurality of guide tubes including first guide tubes arranged for receiving one of said first clusters and second guide tubes arranged to receive one of said second clusters, said guides tubes mechanically connecting said structural element and lower end piece,
   wherein said upper end piece further comprises:
   a support member vertically movable with respect to said structural element, arranged for abutting connection with said first cluster upon fall of said first cluster,
   an abutting element arranged for abutting connection with said second cluster upon fall of said second cluster,
   means for slidably guiding said support member and said abutting element parallel to the axis of the guide tubes, and
   first and second resilient means contained within said upper end and in abutting connection with said structural element, said first resilient means being located between said structural element and said support member and exerting on said support member an upwardly directed force biasing said support member into abutment with said upper core plate while said second resilient means are located between said structural element and said abutting element.

8. A nuclear fuel assembly according to claim 7, wherein said first and second resilient means respectively consist of a first spring and a second spring so located that one only of the two springs is forcibly compressed upon fall of one of said clusters while said two springs are compressed and fulfil a braking function upon fall of the other said clusters.

* * * * *